Oct. 13, 1964     J. B. DAVIS ETAL     3,152,983
MICROBIAL DISPOSAL OF OILY WASTES
Filed Dec. 12, 1961
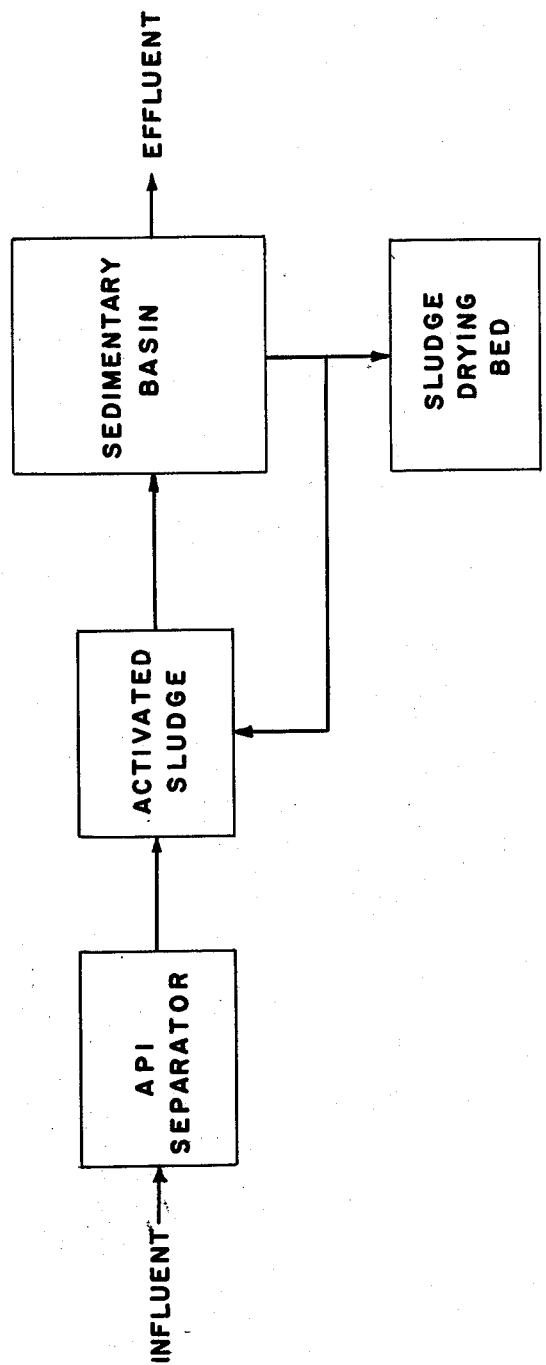
INVENTORS
JOHN B. DAVIS &
RICHARD L. RAYMOND
BY
ATTORNEY

3,152,983
MICROBIAL DISPOSAL OF OILY WASTES
John B. Davis, Dallas, Tex., and Richard L. Raymond, Wilmington, Del., assignors to Socony Mobil Oil Company, Inc., a corporation of New York
Filed Dec. 12, 1961, Ser. No. 158,655
10 Claims. (Cl. 210—11)

This invention relates to purification of industrial wastes. More particularly, it relates to the removal of oil in such wastes by microbial action.

It is well known that microbes are used in treatment of waste products, as, for example, in the disposal of sewage. Use of activated sludge, aeration, diffusers and other accelerating means is well known. Further, oily products can be treated to remove objectionable sulfur compounds using microbial materials such as hydrogenase. Despite the knowledge on hand about treatment of waste products, the treatment of oily sludge or of industrial wastes containing hydrocarbons requires attention. One of the reasons for this is that many microbes will feed first upon the readily digestible materials such as carbohydrates and proteins and crowd out hydrocarbon oxidizers. Another reason is that the microbes are acting in an aqueous medium in which the oily material is immiscible. Even though microbial action may produce detergents and even though aeration is usually used, the desired and necessary contact of the microbes with the hydrocarbons to be removed hithertofore has not been accomplished effectively. Also, while there may be present a myriad of microbes of various kinds that are active on non-oily wastes the waste may be devoid of microbes that utilize hydrocarbons, and, hence, there results no activity on the oily matter in the wastes. Therefore, the desire of industry to remove oily materials from its waste has been hampered. Even though the amounts of oil, for example, in refinery or in oil field waste waters are as small as 100 parts per million, it is desired to remove that portion.

Thus, an objective of this invention is the provision of a process for effective removal of oil or hydrocarbon material from industrial wastes. Another purpose is the speeding up of microbial activity on such wastes so that oily materials are removed quickly and effectively. A still further object is providing a way for microbes particularly effective in their action on oils to attack oily or hydrocarbon material in industrial wastes. These and other objects will appear hereinafter.

The objects of this invention are accomplished by intimately mixing the oily waste to be treated with a microbial culture or sludge enriched with microbes active on hydrocarbons and maintaining the resultant mixture in continual contact with air or oxygen. The oily substrate, an aqueous medium containing water-insoluble oily or hydrocarbon materials, is agitated to decrease the oily globules to the smallest practical size without addition of emulsifiers. Since the amount of oil is very small, this reduction into globules occurs quite readily for there is a great deal of water around to keep an oil droplet once formed from getting together with another. Further, the absorption of the oil by the microbial cells assists in this size reduction. Thus, moderate agitation obtained using air spargers, aeration through a perforated pipe under several pounds of pressure or by a mechanical impeller is generally adequate. Prior to or during the agitation an acclimated microbial flora grown on oily wastes or containing hydrocarbon oxidizers is added to the aqueous system. Thus, the mass is rendered as homogeneous as possible; small oil droplets are formed; the surface of oil exposed to microbial action is vastly increased; oxygen is available; and the microbial action at the oil-water interface is vastly increased with resultant oxidation and adsorption of the wanted materials. The oils and hydrocarbons are caused to volatilize in part, to be oxidized in part to carbon dioxide and other harmless materials, to be converted to microbial cell materials such as protein and lipids and to be adsorbed unchanged on the cells. While some extra-cellular material may be produced most of the hydrocarbonaceous material is converted to intra-cellular products. These are contained in the sediment as part of the cells while any solid extra-cellular products are precipitated by their own weight but being a part of the sediment all of which is easily removed. Periodically, portions of the sludge are removed for charging or recharging vats that are to receive untreated wastes for processing. Since the continuous method affords a more ready maintenance of the concentrate of oxidizers than does the batch process, it is preferred. These acclimated sludges are rich in microbes effective in acting on oily materials. While there may be present microbes which do not oxidize hydrocarbons, there are generally little or no other foods in the hydrocarbon wastes treated by the process of this invention. Thus, the hydrocarbon oxidizers used in the process of this invention have very little competition for minerals, food or oxygen. Fast disposal results.

From the above it can readily be appreciated that the processes involved are chemical processes or manners of new manufacture, as, for example, of a microbial sediment carrying with it as it precipitates oily matter or conversion products of the oil used by the microbes in metabolism. Further, it is to be appreciated that an operator is required, this operator maintaining the appropriate conditions and driving the micro-organisms to the desired results. The operator separates the resultant mixtures or the desired products for further utilization as desired.

A large variety of microbes may be used in the process of this invention, and many of these may be naturally present in the wastes initially. These may be present: the various Bacillus, the various Clostridia, the various Pseudomonas, the Mycobacteria, the Nocardia, such as *Nocardia salmonicolor* and *Nocardia corallina,* the yeast-like Torula, and filamentous fungi such as Penicillium and Phycomyces. It is, of course, as stated above preferred to inoculate the sludge that is to act on the oily wastes with microbes known to attack hydrocarbons. One way of doing this is to place oil-contaminated soil found in the oil field in the fermentor or oxidator. Such soils are richer in hydrocarbon oxidizers than normal soils. If desired, sample soils can be used as a source of such microbes for culturing purposes. That is, the hydrocarbon oxidizers can be propagated by growing them in the presence of air and a hydrocarbon in liquid media containing the normal mineral salts for growth such as the nitrates. Thus, a culture very rich in microbes most active on oils is isolated, and these concentrates can be used to inoculate the industrial vats. It is possible to obtain these hydrocarbon oxidizers from normal soils or from river or lake waters but the oil contaminated soils afford a ready source, and these are generally used.

It is also preferred that the waste to be acted upon by the microbes be, prior to the addition of the cells, in a condition most conducive for microbial action. Thus, the waste will usually be about neutral, having a pH of about 6.0 to about 8.0 with a pH of 7.0 being preferred and it will be essentially free from toxic materials. Normal temperatures are used. As stated above, the waste will contain, or be charged with, certain inorganic materials that promote microbial growth, as, for example, the nitrates or ammonium salts and phosphates. In many instances it is necessary to add such materials while in others these chemicals will be present in sufficient quantities as a characteristic of the waste, while in still others the nature of the microbe and its converting power will preclude the addition of certain of the inorganics. Under the conditions of having the essential food material, adequate agitation, adequate aeration or contract with oxygen sources and active microbial flora present, the sludges of this invention accomplish oil removal in remarkably short times with efficient, high conversions of the oily mater to innocuous materials.

This invention will be understood by reference to the figure and to the examples given below which are given for illustrative purposes only and are not limitative. Parts and percentages are given by weight unless otherwise stated.

In the figure, a flow diagram, it can be seen that the influent is sent to an ordinary API separator which removes the large majority of oil and is, as known, a normal step in the recovery of oils or hydrocarbon matter at refineries or in oil fields. These separators, while very effective, do not recover the entire amount of hydrocarbons in the influent, a very small amount being discharged which is in the order of 100 parts per million. It is desired to prevent effluents containing even that small amount from being discharged into rivers, and the microbial process of this invention is designed to remove these small amounts quantiatively. From the separator the influent will be charged into a vat containing an activated sludge of this invention which is rich or contains microbial hydrocarbon oxidizers to a much greater extent than sludges hithertofore have contained. As the influent is being charged into the vat or prior thereto it is treated, if necessary, with neutralizers. For example, if the influent is acidic, ammonia may be bubbled into the aqueous matter, or if basic, nitric acid may be added. In this way, an inorganic form of nitrogen is made available along with neutralization. In certain instances, it will be necessary to add other inorganics. Usually, a standard mixture is kept on hand and is charged to the influent.

Such a standard normally contains the following salts, the amount in parenthesis indicates the number of parts used per 1000 parts of water: ammonium sulfate (1.0), disodium hydrogen phosphate (0.3), potassium dihydrogen phosphate (0.2), sodium carbonate (0.1), calcium chloride (0.01), ferrous sulfate septahydrate (0.005), and manganous sulfate (0.002). These and other inorganic salts may be simply added in the solid form to the aqueous influent or they may be dissolved first and then added. The amounts mentioned are merely suggestive for one will determine the mineral content of the given influent prior to starting the process and adjust the salt content in accordance not only with that determination but with the requirements of the given microbe or microbes being used. Very frequently it is found that the main mineral salts needed to be added to the waste water are nitrogen and phosphate salts. For this purpose diammonium hydrogen phosphate is used. Its addition in amounts of about 0.1% generally satisfies the need.

With the influent now under optimum conditions as to growth material promoters and temperature, being normal room temperatures of about 20° C. to about 35° C., the waste is acted upon by an activated sludge of this invention. As stated previously, this sludge contains predominantly microbes that attack hydrocarbons. At this state the influent and the activated sludge are quite vigorously agitated and air is uniformly passed into the stirred mass, assisting in the agitation. The vat is open to the atmosphere, and volatile materials are readily discharged into the air. After several hours the resultant mass is passed to a sedimentary basin. From this basin will be taken aliquots of enriched cultures which are added to an activated sludge in use or which are used to form the culture or sludge to be used for the incoming new influent, as shown in the figure.

It will be appreciated that while only one activated sludge treatment is shown, the influent may be passed from one oxidator to another, in seriatim, as desired before it is passed to the sedimentation basins. In such stepwise processes, the influent may first be subjected to the action of microbes which remove harmful sulfur compounds or convert them to non-injurious forms. If the waste contains more than about 100 parts per million of oily matter, it is sent to an API separator or similar device which is used to skim off or similarly remove most of the oil. Thus, the modified wastes, whether they come from an oil operation, a city or whatever, are reduced in oil content to about 100 parts per million or less. The modified influent is then passed to another oxidator, or from an API separator directly to a first oxidator as the case may be, which oxidator contains a concentrate of oil microbial oxidizers. In any event the effluent that comes from the sedimentation basin is oil-free or substantially so, and the effluent can be discharged into streams and rivers without any harmful effects upon nature. In the sludge drying bed are the solids and occluded liquids, leaving the effluent clean.

In the process of this invention it is to be appreciated that the oily materials and hydrocarbons are being removed in several ways. First, by the vigorous stirring and aeration used prior to, during or after the step involving the use of the enriched culture, volatile carbon containing materials, such as hexane, cyclohexane, benzene and toluene, are discharged into the atmosphere. The principal one is carbon dioxide; very minor amounts of other harmless carbon compounds are also vaporized. Secondly, the oils and hydrocarbons are being converted into other chemicals by the microbes, these chemicals going to the cells as the microbes multiply. These chemicals are mainly lipids and proteins. Finally, the mass of cells will adsorb oils and hydrocarbons. For example, if a quantity of a sludge of this invention is isolated and is extracted with a hydrocarbon solvent so as not to destroy cell structure it is found that unchanged oil can be recovered. Similarly, if an activated sludge of this invention is placed and kept in fresh influent containing oil, omitting agitation and aeration to minimize chemical conversion of the oil, it is found that the oil becomes homogeneously mixed throughout the sludge within a few hours so that there is no oil apparent in the system. It appears that the oil has actually been destroyed. However, upon removal of the sludge from the sedimentation tank practically all of the original oil may be recovered by extraction.

Thus, in the sedimentation step the activated sludge will take with it as it settles to the bottom all unchanged oil or hydrocarbon matter. The effluent is discharged free from such matter. The settled matter may be taken for charging, recharging or reinforcing oxidators or it may be sent to a sludge drying bed as shown in the figure. Upon drying this material may be burned if desired or more advantageously it can be used in land-fill operations or a fertilizer.

The following examples are given as illustrative:

*Example I*

A microbial innoculum taken from oil-contaminated soil at certain warehouse grounds was placed in each of two different growth media, one being a mineral salts medium such as described above and the other being a yeast extract peptone broth. Each was added to an aqueous influent containing 1% of oil, purposely made exceedingly higher in oil content that normal wastes. The masses were agitated and aerated for two weeks, testing for destruction of the crude oil by extraction. Control runs showed in the absence of the microbes no destruction of the oil. After one week in those runs containing microbes in the mineral medium about 39% of the oil was destroyed in the presence of microbes, and after two weeks about 54% had been destroyed. In a similar test using a crude oil from a different oil field the results were 33% and 46%, respectively. Those microbes in the yeast extract medium led to 27% and 50% destruction with the one crude and 28% and 42% with the other in the same time periods.

This demonstrates the slow action of initial or unriched or unactivated sludges.

Example II

An oil-contaminated soil was grown on a crude oil for three days and 0.01 part of the culture was added to 50 parts of a fresh mineral salts medium containing 1% crude oil. This culture was grown for 24 hours under conditions of aeration and agitation when a second transfer was made.

In this transfer 0.01 part of culture was added to 50 parts of another fresh mineral salts medium containing 1% of crude oil. Whereas in the previous treatments no destruction of oil could be detected using the slightly enriched culture, in this transfer a 28% destruction of oil, including volatility accounting, resulted in 20 hours.

When 0.01 part of this culture was transferred in the same manner, 35% destruction occurred in 18 hours and when 1 part was used 57% destruction resulted in 18 hours.

These results demonstrate the rapid destruction of hydrocarbons by the progressive use of cultures enriched in hydrocarbon oxidizers.

Example III

The enriched cultures of this invention upon microscopic examination are found to contain various types of microorganisms. Thus, the process of this invention is not dependent upon the present of a particular microorganism as can be seen from the above examples and the following:

To an aqueous system containing 295 parts of a crude oil was added 87 parts of the enriched culture. Aeration and agitation were effected as described above. Within 24 hours, 145 parts of the crude were destroyed with a 60% conversion of this material to microbial cells. At the end of this time 150 parts of the crude were effectively absorbed on the cells then present in the sludge, the effluent being free of the oil.

Noted in such cultures as that on this example are certain Pseudomonas, Mycobacteria and fungi. In others the Nocardia appear to dominate with a variety of other oxidizers being present. While cultures can be prepared having only cells of a particular microbe and while such cultures can be used in the process of this invention, it is preferred to use mixtures of the oxidizers, such as were used in the above example. The reason for this is that a given microbe may be a much better destroyer of a given component in the oily waste than is a second microbial oxidizer. Thus, a variety of microbes in the culture results in an activated sludge that has a much higher capacity of destroying a myriad of hydrocarbons than does a culture of a single microbial oxidizer.

Thus, oily wastes of various kinds and sources can be effectively treated by the processes of this invention. These wastes contain about 0.01% by weight or less of the oily matter or about 10 mg. per 100 grams. By the processes of this invention about 8 mg. is converted to 6 or 7 mg. of microbial cells and about 2 mg. of the oily waste is absorbed by 6–7 mg. of cells. The effluent becomes substantially oil-free, and this is accomplished in less than 24 hours.

The process of this invention affords a number of advantages in addition to rapid treatment of wastes and avoidance of stream pollution. One of these is that the enriched sludges of the invention adsorb both soluble and insoluble materials. Still another is that a microbial mixture is used which affords frontal attack on a variety of water contaminants. Another rests in the production of solids which can be constructively used.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

We claim:

1. A process for the accelerated destruction of hydrocarbonaceous matter contained in aqueous wastes coming from a petroleum refinery which comprises preparing a microbial culture containing primarily microorganisms that oxidize hydrocarbons; reducing the hydrocarbonaceous content of said waste to no more than about 100 parts per million; adding the said rich culture to the resultant waste; and agitating and aerating the resultant mass to effect the accelerated destruction of the said hydrocarbonaceous matter by the oxidative action of said microbes.

2. A process in accordance with claim 1 in which a portion of the hydrocarbonaceous matter is adsorbed by said microbes.

3. A process in accordance with claim 1 in which a portion of the hydrocarbonaceous matter is oxidized into volatile compounds.

4. A process in accordance with claim 1 in which the said culture contains a variety of hydrocarbon oxidizers.

5. A process in accordance with claim 1 in which said culture contains a Nocardia.

6. A process in accordance with claim 1 in which the step of oxidizing the said hydrocarbonaceous matter by said microorganisms is accomplished in less than 24 hours.

7. A process for the accelerated destruction of hydrocarbonaceous matter contained in an aqueous medium which comprises securing microorganisms from oil-contaminated soil and concentrating those cells therein that are hydrocarbon oxidizers by successively growing the secured microorganisms in the presence of air and a hydrocarbon to obtain a culture containing predominantly microorganisms that are hydrocarbon oxidizers and aerobically propagating that culture on a hydrocarbon diet; adding the resultant microbial culture to an aqueous medium containing said hydrocarbonaceous matter; and allowing the said organisms in said culture to feed aerobically upon said matter thereby destroying said matter.

8. A process in accordance with claim 7 in which said resultant culture contains mainly organisms of the genus Nocardia.

9. A process in accordance with claim 7 which includes the step of agitating the said microorganisms in the said rich culture of hydrocarbon oxidizers while in said aqueous medium during said feeding.

10. A process in accordance with claim 7 in which hydrocarbonaceous material is adsorbed on cellular matter and removed therewith from said aqueous medium.

References Cited in the file of this patent

FOREIGN PATENTS 228,637     Australia _____ June 9, 1960

OTHER REFERENCES

"Bench-Scale Biological Oxidation of Refinery Wastes With Activated Sludge," Coe, Sewage and Industrial Wastes, vol. 24, June 1952, pp. 731–749.

Biological Abstracts, vol. 31 (1957), 1917, 1918, on page 191.

"Biological Disposal of Refinery Wastes," Gilliam et al., Proc. 14th Ind. Wastes Conf., Purdue University, pages 145–154 (1959).